Aug. 29, 1967  J. H. THEDICK  3,338,427
AUTOMATIC STACKING APPARATUS
Filed Dec. 9, 1965  3 Sheets-Sheet 1

INVENTOR.
JOHN H. THEDICK
BY Leslie G. Noller &
Patrick D. Coogan
ATTORNEYS

Aug. 29, 1967  J. H. THEDICK  3,338,427
AUTOMATIC STACKING APPARATUS
Filed Dec. 9, 1965  3 Sheets-Sheet 3

INVENTOR.
JOHN H. THEDICK
BY
ATTORNEYS

United States Patent Office 3,338,427
Patented Aug. 29, 1967

3,338,427
AUTOMATIC STACKING APPARATUS
John H. Thedick, Klamath Falls, Oreg., assignor to Weyerhaeuser Company, Tacoma, Wash., a corporation of Washington
Filed Dec. 9, 1965, Ser. No. 512,642
10 Claims. (Cl. 214—6)

This invention relates to an article handling apparatus and more particularly to an apparatus for automatically stacking articles such as lumber.

The trend toward rapid grading and sorting of articles has been experienced in many fields, but it is particularly present in the conversion of lumber products, where high volumes of relatively large and heavy boards are rapidly passed from one converting station to another in the process of producing the various grades and sizes of useful lumber. To handle this high volume, it has been necessary to develop various automatic handling systems, including automatic equipment for stacking the sorted grades of lumber. Such equipment is characteristically heavy-duty, expensive and large in size. If there are several grades and sizes of lumber to be individually stacked, the expenditure for building space and capital equipment to handle a large volume of such lumber dictates that such stacking equipment must be no larger, no more complicated and consequently no more expensive than necessary. It is therefore the object of this invention to provide an improved automatic stacking apparatus which is rugged in construction, reliable in operation, and which takes up a minimum amount of floor space.

It is another object of this invention to provide an article stacking apparatus which utilizes trouble-free drive and control equipment which are not adversely affected by large variations in seasonal temperatures.

It is a further object of this invention to provide a stacking apparatus which includes position controls for the article supports which insure that the articles are not damaged during the stacking operation.

A still further object of this invention is to provide an improved stacking apparatus which accommodates a large range of lengths and widths of articles without any adjustments being required of the equipment. Other related features and objects of the invention will become more fully apparent as the following description is read in conjunction with the accompanying drawings, wherein.

Figure 1:
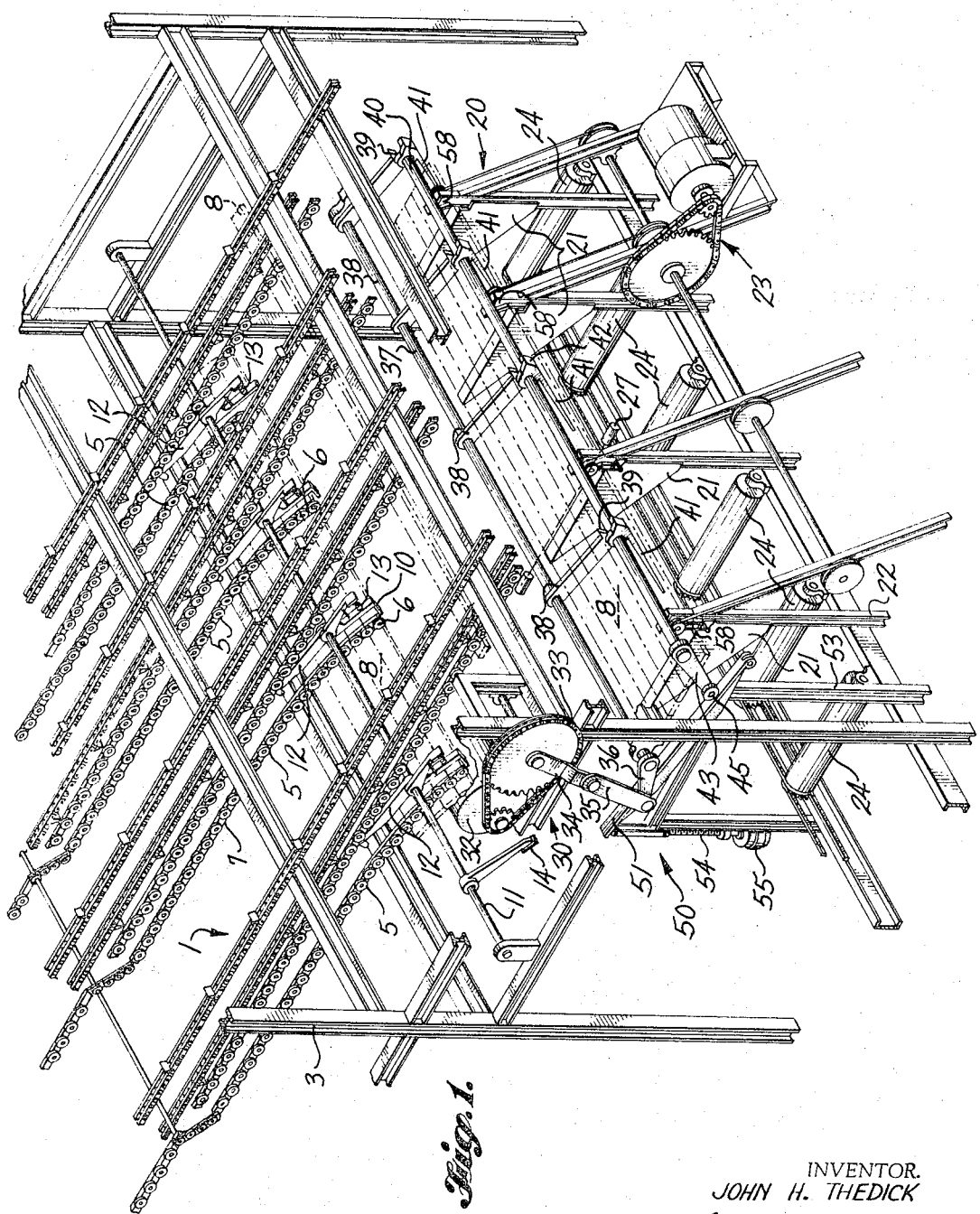
FIGURE 1 is a perspective view of the stacking apparatus illustrating the general arrangement of the components needed to form one stack in accordance with the present invention.
Figure 2:
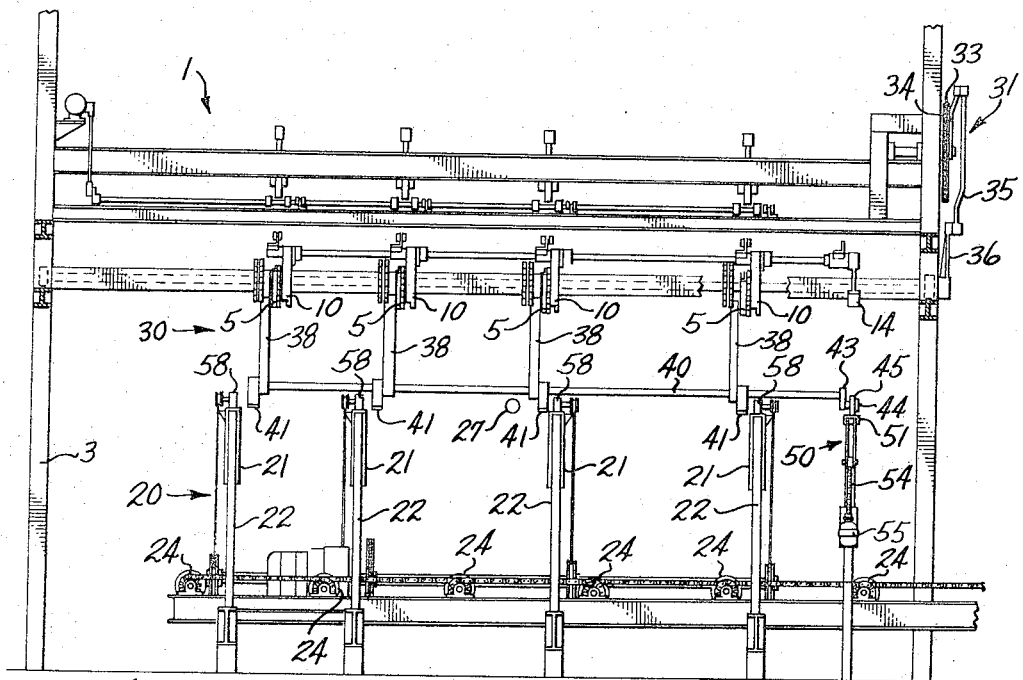
FIGURE 2 is an end elevation view of the stacking apparatus of FIGURE 1.

Referring to the drawings with more detail, there is seen in FIGURES 1 and 2 the general arrangement of the stacking apparatus 1. The basic components of the stacking apparatus 1 are the article feed conveyer 5, the article stack support assembly 20, the transfer assembly 30 which consists of a drive means 31, the article support fingers 41, the control arm 43, and the cam assembly 50, which cooperate with the stripping members 58 to neatly stack articles such as pieces of lumber 8.

The stacking apparatus 1 is mounted upon and supported by a suitable frame 3. The feed conveyer 5 consists of conveyer supports 6 which are attached to frame 3 and upon which may be mounted live rollers 7 for supporting pieces of lumber 8. The articles, such as lumber 8, are prevented from falling from the conveyer support 6 by means of first stop levers 10 which are keyed to stop shaft 11. Second stop levers 12, rotatably supported by stop shaft 11, are positioned remote from the first stop levers 10 and are biased away from stop levers 10 by means of springs 13. Actuator arm 14 is also keyed to stop shaft 11.

The article stack support assembly 20 consists of suitable stack support members 21 which may be guided for vertical movement on elevation guide frame members 22 and moved vertically by means of suitable elevating means 23. When in the lower-most position, the stack support members 21 permit the lumber 8 to rest on roll case 24 so that it can be transferred by means of rollers to other conveyers. The stack support assembly 20 may include stack level sensing elements, such as photoelectric cell 27, which will sense the level of the stack and, through appropriate controls, lower the stack at the end of each cycle of operation of the stacking apparatus.

The article transfer assembly 30 includes a suitable drive means 31, which may include an electric gear motor 32 which is supported on frame 3 and which drives through drive chain 33 a crank 34, which in turn is connected through connecting rod 35 to lever 36 which is keyed at one end to shaft 37. A series of drive arms 38 are also keyed to shaft 37 and include an abutment 39 at their end remote from shaft 37. The shaft 40 is rotatably mounted at the end of drive arms 38, and keyed to shaft 40 are article support fingers 41 which include abutments 42 which are positioned to engage abutments 39 on drive arms 38 whenever the arms 38 are positioned approximately 90° from fingers 41. Also keyed to shaft 40 is control arm 43 with a cam follower 44, such as roller 45 positioned at its end remote from its connection to shaft 40.

The cam follower 44 or roller 45 of control arm 43 is slidable along the ramp 51 of the cam assembly 50 which may be hinge-jointed to the frame member 53 at hinge joint 52. The ramp 51 can be raised or lowered by means of the screw 54 which may be connected to the motor 55.

Stripping members 58 may be mounted at the top end of elevation guide frame members 22 to engage the side edges of the lumber 8 as it is being carried by fingers 41 relative to the stripping members 58. It should be noted that the upper end of the stripping members 58 may be flared out at 59 to allow clearance for the last piece of lumber to fall flat on the load.

Figure 3:
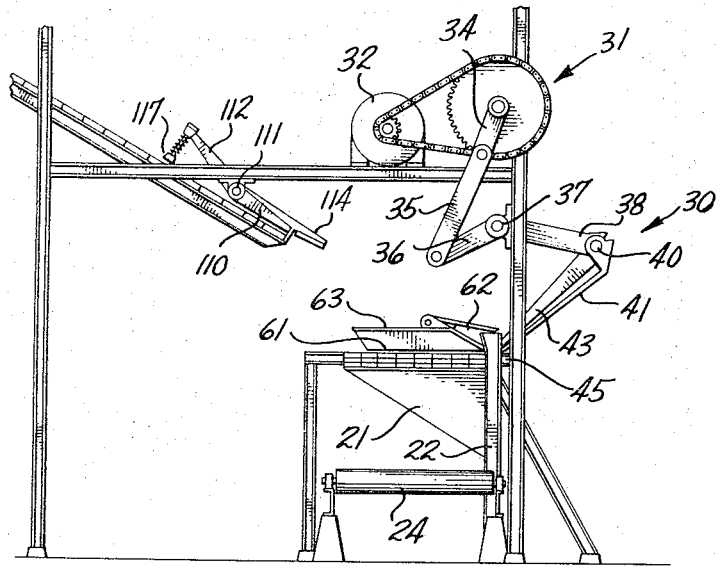
FIGURE 3 is a partial side elevation view of a modification of the stacking apparatus shown in FIGURE 1.
Figure 4:
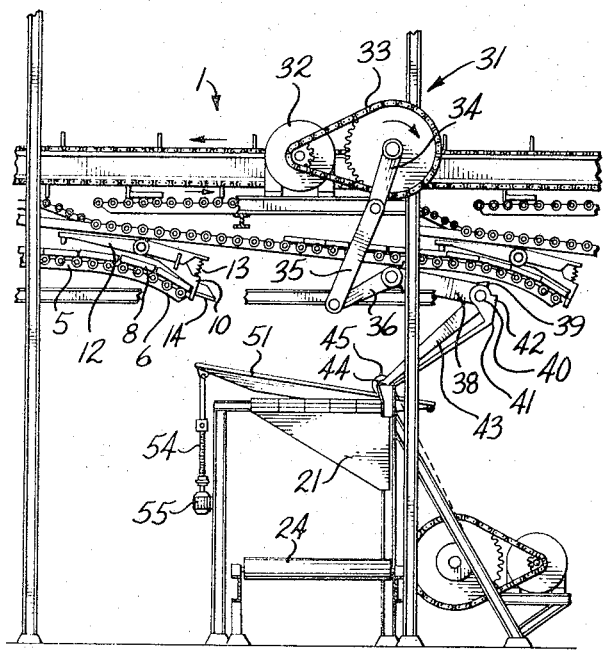
FIGURE 4 is a partial side elevation view of the stacking apparatus of FIGURE 1 at the beginning of an operating cycle.

There are many variations in each of the components of the stacking apparatus 1 which can operate to perform the same functions. For example, the feed conveyer 5 can be an incline of such an angle that there is no need for rollers 7. Also, the stop mechanism may take on various forms. A modified form to that shown in FIGURE 1 is shown in FIGURE 3, wherein the first stop levers 110 are qeyed to the stop shaft 111 as are the second stop lever 112 and the stop shaft actuator arm 114. The end of the second stop levers 112 may include spring-loaded tabs 117 which are used as upper stop means.

The modification shown in FIGURE 3 discloses a cam assembly 60, wherein a lower cam tract 61 is used during the stripping stroke, and an inclined section 62 and a more level section 63 are used during the initial phase of the loading cycle.

It is possible to modify the ends of the lumber fingers 41 to include some type of rollers so that they themselves can act as the control arm and the top of the stack can act as the cam surface. While such a modification may work poorly in stacking lumber, it is possible to use such a modified finger control and cam assembly when large uniform articles such as plywood sheets are being stacked.

By using the preferred drive means 31 and the conveyer stop actuation mechanisms as described above, it is seen that such reliable components result in a rugged stacking apparatus 1. Since it is not dependent upon air or hydraulic cylinders and valves for its operation, it will provide trouble-free operation regardless of the atmospheric conditions of hot or cold weather.

The operation cycle of the apparatus 1 is shown in the FIGURES 4 through 7. The lumber 8 is advanced by a suitable conveyer to the feed conveyer 5, where it becomes accumulated. Once there is sufficient lumber to equal one course or level of lumber, the cycle of the lumber stacker begins. This can be initiated by a suittable limit switch, not shown, which may be installed at a position near the remote end of the second stop lever 12. Once this limit switch is actuated, the gear motor 32 is actuated, moving the drive chain 33 and consequently the crank 34 in a clockwise direction which causes the drive arms 38 to also move in a clockwise direction. At this time the roller 45 or the cam follower 44 moves along the top of the ramp 51 which is in the raised position. This movement raises the lumber fingers 41 clear of the load on the stacking support assembly 20.

Figure 5:
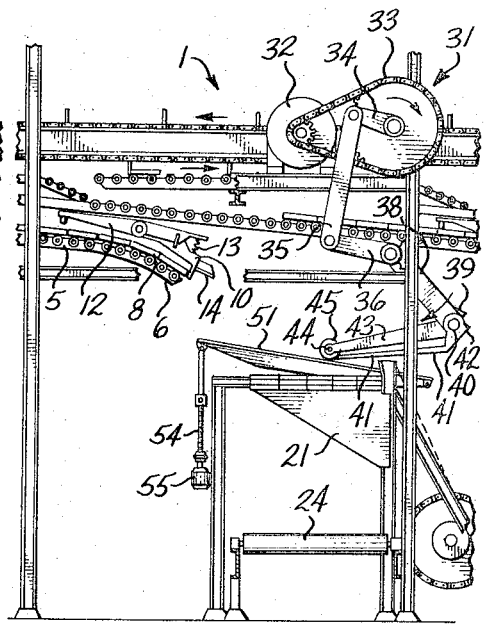
FIGURE 5 is a partial side elevation view of the stacking apparatus of FIGURE 1 illustrating its position halfway to the loading position.

FIGURE 5 shows the stacking mechanism 1 at the beginning part of the cycle with the roller 45 travelling up the raised ramp 51. After the roller moves off the extreme edge of the ramp 51, the control arm 43 continues to rotate on the shaft 40 until the abutments 42 on the lumber fingers 41 engage the abutments 39 on the drive arms 38.

Figure 6:
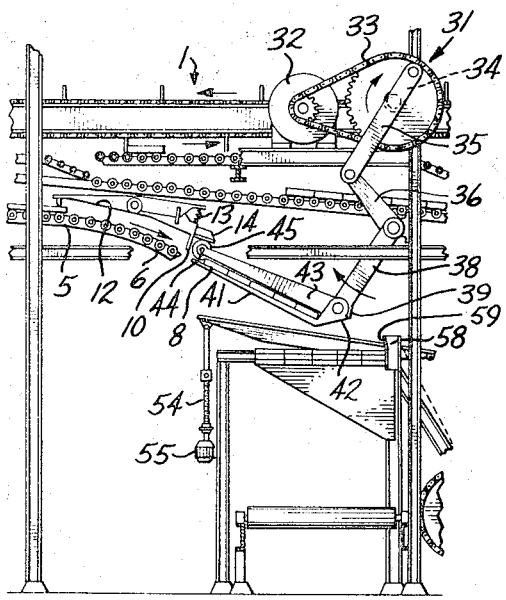
FIGURE 6 is a partial side elevation view of the stacking apparatus of FIGURE 1, showing the beginning of the return cycle.

FIGURE 6 illustrates the stacking apparatus 1 at the mid-point of its cycle. The lumber fingers 41 are now in alignment with the conveyer support 6, and the roller 45 has engaged the stop shaft actuator arm 14, raising the first stop levers 10 to permit the lumber 8 to slide down conveyer 5, assisted by the rollers 7, onto the lumber fingers 41. At the same time, the springs 13, spanning between the first stop levers 10 and the second stop levers 12, urge the second stop levers 12 to engage the top of the next board to stop it from being conveyed down the conveyer 5. This allows one course of lumber 8 to proceed onto the lumber fingers 41. At this point, the connecting rod 35 has reached the end of its travel and the continued rotation of the gear motor 32 causes the drive arms 38 to rotate in a counter-clockwise direction, to initiate the return half-cycle, or stripping cycle, of the stacking apparatus 1.

Figure 7:
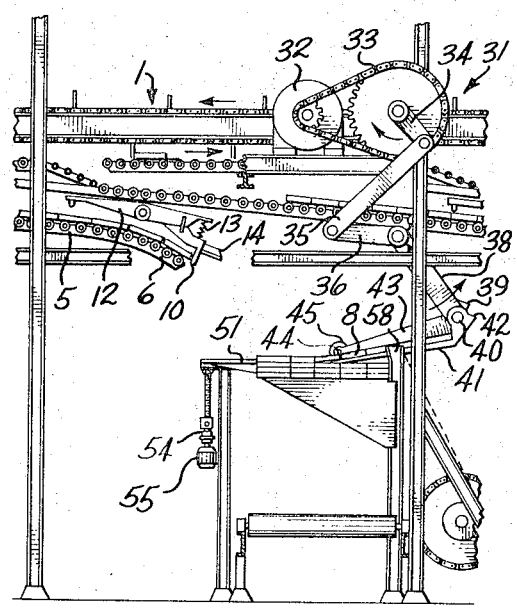
FIGURE 7 is a partial side elevation of the stacking apparatus of FIGURE 1, showing it near the end of the operating cycle.

FIGURE 7 illustrates the stacking apparatus during the stripping part of the cycle. The roller 45 leaves the stop shaft actuator arm 14, the first stop levers 10 lower and the second stop levers 12 raise, allowing the lumber 8 to proceed down the conveyer 5 to be engaged by the first stop levers 10. The control arm 43 rotates down until the roller 45 reaches the ramp 51, which has now been lowered, by operation of the screw 54 and the motor 55, to the horizontal position which is level with the uppermost surface of the stack. The lumber 8 at this point has on one edge contacted the flared-out section 59 of the stripping member 58. As the lumber fingers 41 withdraw from underneath the course of lumber 8, it is deposited on the stack being stripped off by the stripping member 58. Subsequently, the stacking apparatus returns to the position shown in FIGURE 1 and the elevating means 23 is actuated to lower the stacking supports 21 so that the top of the stack is in the same horizontal plane as is ramp 51 in its lowered position. The cycling is continuous until the limit switch, located on the conveyor support 6, indicates that a full course of lumber is not accumulated, or a full load has ben stacked, or is being removed by means of the roller case 24 and the support members 21, have not been raised for the start of a new load.

It is therefore seen that I have disclosed an automatic lumber stacking apparatus which is simple in its structure and operation, which utilizes the minimum of floor space, and which provides reliable operation.

Having thus described my invention, what I claim and desire to protect by Letters Patent is:

1. An apparatus for stacking articles which comprises in combination:
   article feed conveying means,
   article stack supporting means,
   transfer means, for receiving articles from said feed means and placing them onto said supporting means, including article supporting fingers for supporting said articles, control arm means operatively connected to said finger means for guiding them relative to said stack supporting means, and drive means operatively connected to said finger means for moving them relative to said feed and supporting means,
   cam means including surface means engageable by said control arm means to pass said finger means close to but not in contact with the surface of articles supported by said supporting means,
   stripping means positioned adjacent said supporting means and in the path of articles supported by said finger means for stripping said articles held by said finger means off onto said supporting means as said finger means pass relative to said stripping means.

2. The apparatus for stacking articles of claim 1 including:
   elevating means operatively connected to said supporting means for moving said supporting means vertically relative to said transfer and cam means.

3. The apparatus for stacking articles of claim 1 wherein:
   said stripping means includes a flared-out section which makes contact with the edges of said articles when said finger means move relative to said supporting means.

4. The apparatus for stacking articles of claim 1 wherein:
   said supporting finger means are keyed at one end to a shaft means, and
   said control arm means is keyed at one end to said shaft means.

5. The apparatus for stacking articles of claim 1 wherein:
   said surface means of said cam means is at a higher elevation when said finger means are moved by said drive means from said stacking means to said feed means and at a lower elevation when said finger means are moved by said drive means from said conveying means to said stacking means.

6. The apparatus for stacking articles of claim 5 wherein:
   said cam means includes drive means for positioning said surface means at said higher and lower elevations.

7. The apparatus for stacking articles of claim 4 including:
   drive arm means operatively connected at one end to said drive means and rotatably connected at the other end to said shaft means,
   said drive arm means including abutment means at said other end,
   said finger means including abutment means at the end where they are connected to said shaft means,
   the abutment means of said drive arm means engaging the abutment means of said finger means when said drive arm means has positioned said finger means near said conveyer means.

8. The apparatus for stacking articles of claim 1 wherein:
  said conveyer means includes stop means and stop actuator means,
  at least one of said stop means being keyed at one end to a stop shaft means and being engageable at said other end with said articles being conveyed on said conveyer,
  said stop actuator means being keyed at one end to said stop shaft and including a contact area which is engageable by said control arm means to move said first stop means out of engagement with said articles on said conveyer, permitting them to pass from said conveyer to said finger means.

9. The apparatus for stacking articles of claim 8 wherein:
  said conveyer means includes a second stop means operatively connected to said stop actuator arm means and positioned to permit passage of said articles on said conveyer means until said actuator means is engaged by said control arm means at which time said second stop means engages articles on said conveyer means, preventing them from passing onto said finger means.

10. The apparatus for stacking articles of claim 9 wherein:
  said first stop means is spring biased away from said second stop means.

References Cited

UNITED STATES PATENTS 3,195,739  7/1965  Hein et al. _____ 214—6

FOREIGN PATENTS 483,561  10/1929  Germany.
605,014  11/1934  Germany.

GERALD M. FORLENZA, *Primary Examiner.*

J. E. OLDS, *Assistant Examiner.*